Oct. 9, 1962 R. H. KNIPPING 3,057,308
GARBAGE AND RUBBISH INCINERATOR SYSTEM
Filed Jan. 23, 1959 4 Sheets-Sheet 1
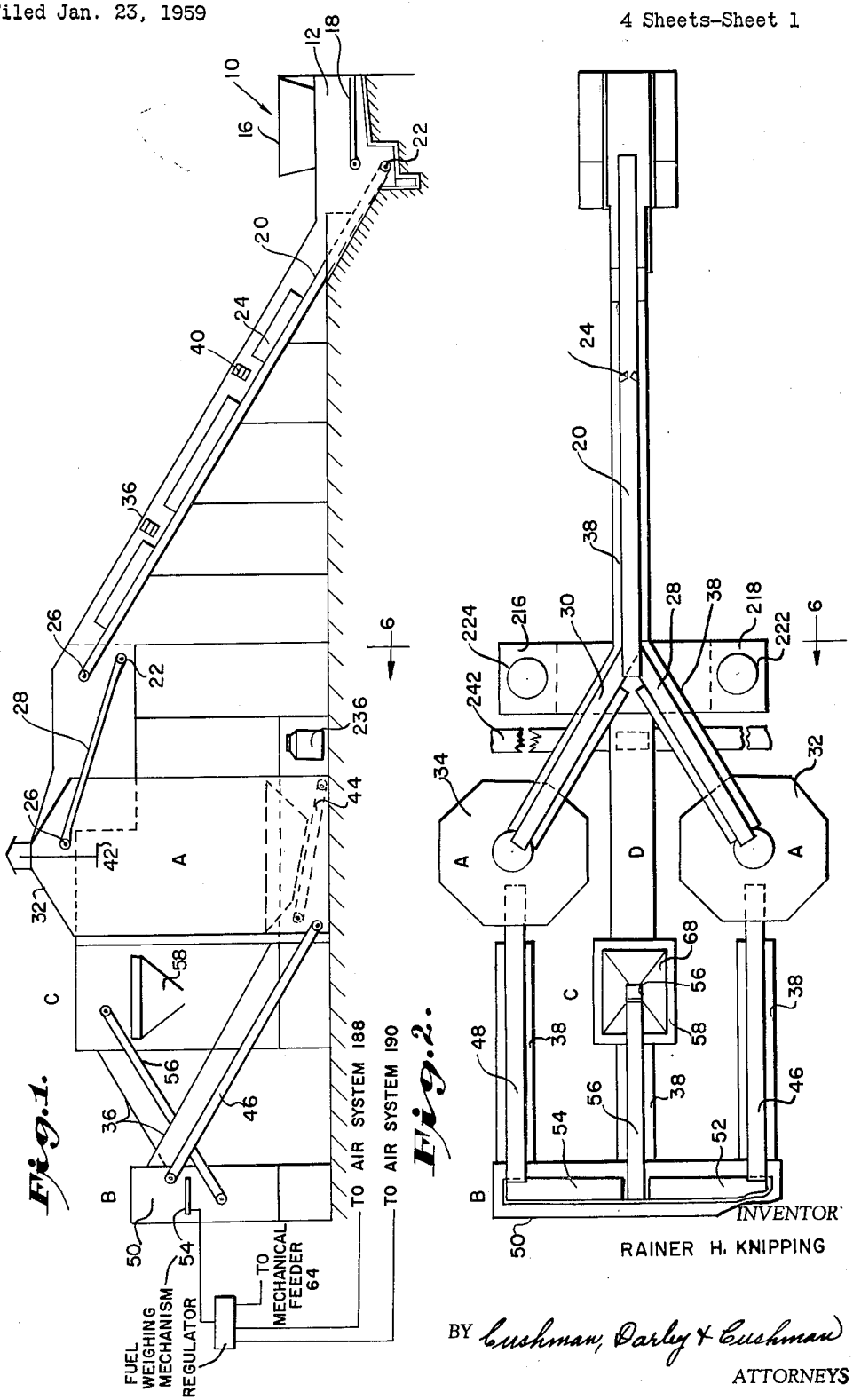
INVENTOR
RAINER H. KNIPPING
BY Cushman, Darby & Cushman
ATTORNEYS Oct. 9, 1962 R. H. KNIPPING 3,057,308
GARBAGE AND RUBBISH INCINERATOR SYSTEM
Filed Jan. 23, 1959 4 Sheets-Sheet 2

INVENTOR
RAINER H. KNIPPING
BY Cushman, Darby & Cushman
ATTORNEYS

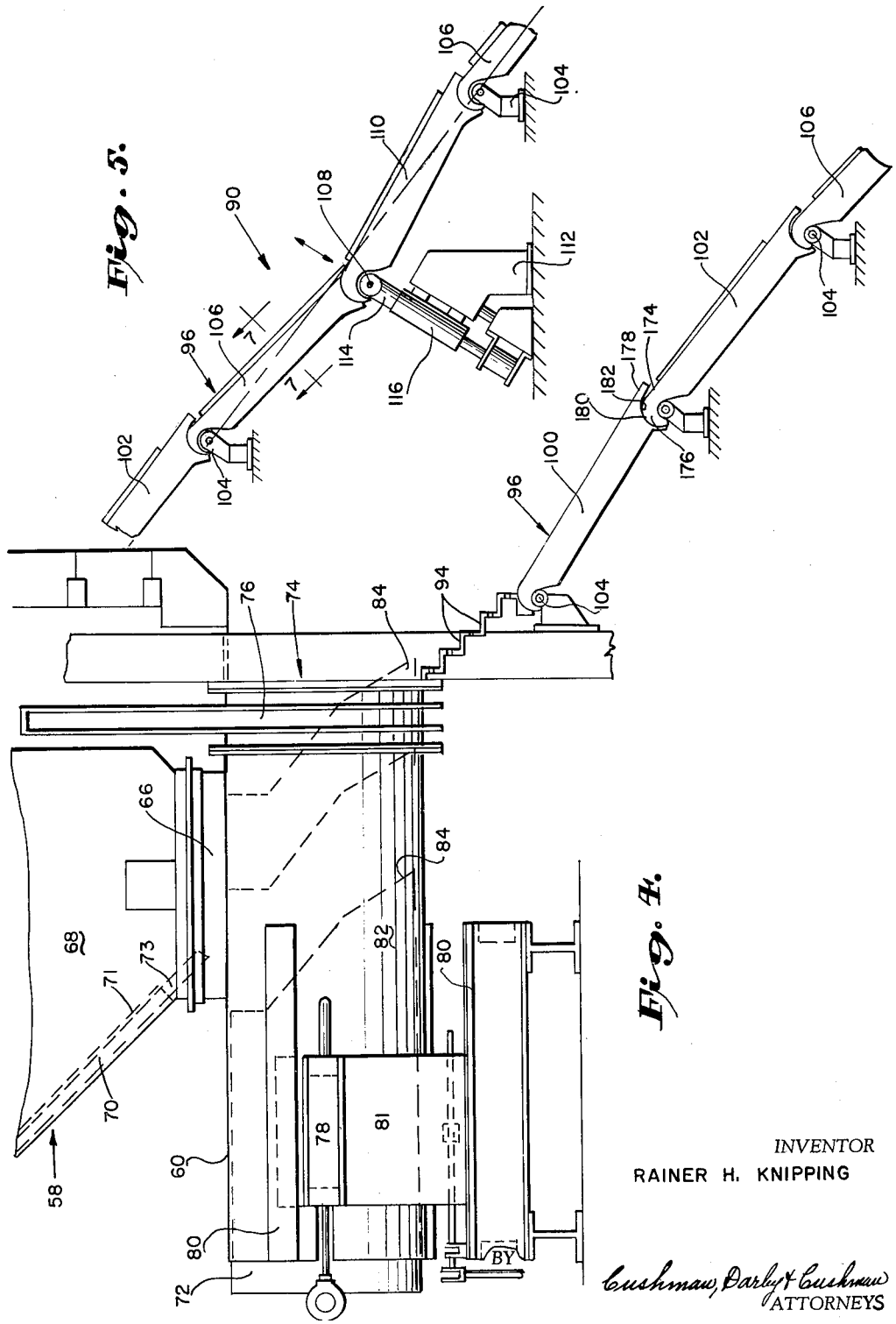

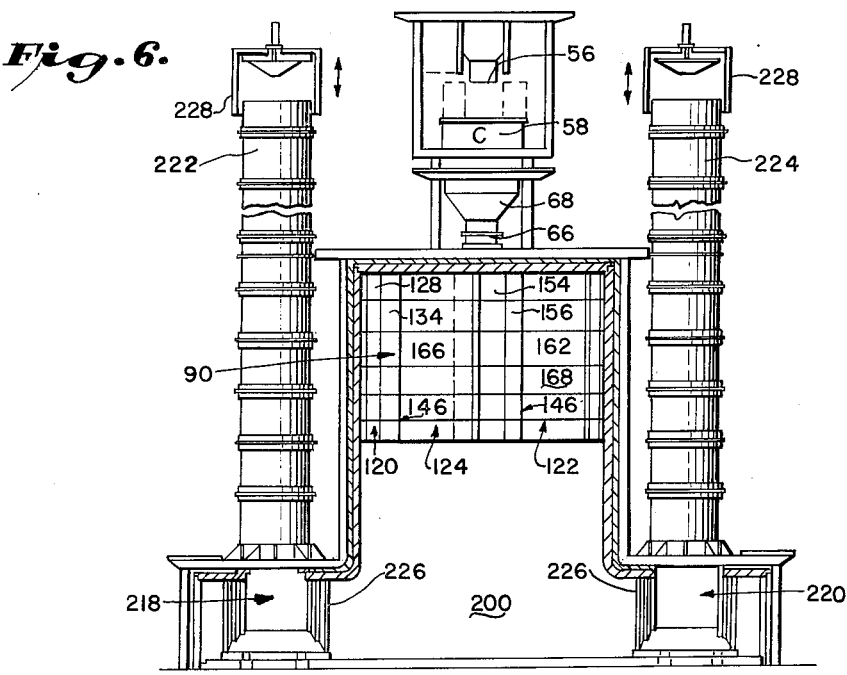
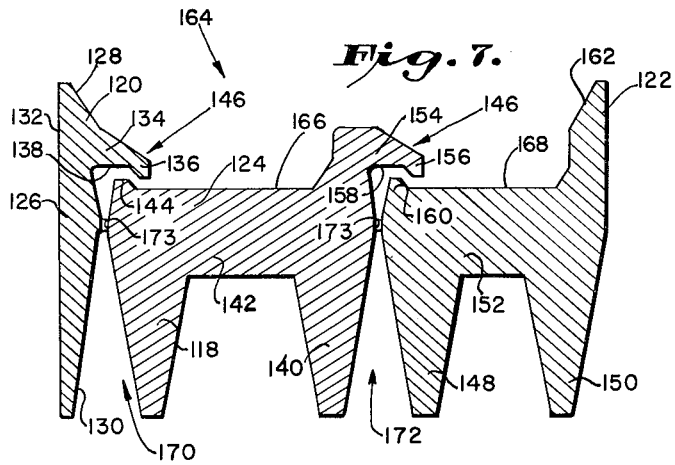

//

3,057,308
GARBAGE AND RUBBISH INCINERATOR SYSTEM
Rainer Hubert Knipping, P.O. Box 367,
San Antonio 6, Tex.
Filed Jan. 23, 1959, Ser. No. 788,605
5 Claims. (Cl. 110—8)

This invention generally relates to a disposal system for processing waste material and has particular reference to a garbage incinerator. Until now, the disposal of garbage by municipal processing facilities could not be regulated to meet different tonnage requirements which varied widely in accordance with daily collections.

Accordingly, the primary object of the present invention resides in the provision of an improved garbage incinerator in which the disposal rate can be varied in accordance with daily collections without decreasing combustion efficiency.

A further object of this invention relates to a garbage incinerator of high efficiency which will promote complete combustion by effecting a controlled reflex movement of furnace gases through the combustible material.

An important object of the present invention resides in the provision of separate pressurized air systems for increasing combustion efficiency; the total output of each system being proportionately regulated in accordance with the amount of material introduced into the combustion chamber for consumption.

A further object relates to an undulating grate structure which progressively moves waste material through the combustion chamber while deflecting the movement of air laterally across the fuel bed to improve internal combustion.

A still further object of the present invention resides in the provision of a garbage and rubbish disposal system of the aforementioned type which is both reliable and economical in operation, completely sanitary, and otherwise well adapted for the purposes for which the same is intended.

Other objects and the entire scope of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent as the description herein progresses.

Reference being made to the accompanying drawings, wherein like numerals refer to like parts throughout, and in which:

FIGURE 1 is a schematic side-elevation illustrating a disposal system constructed in accordance with the principles of this invention, with certain control means shown diagrammatically;

FIGURE 2 is a schematic top-plan view of the disposal system shown in FIGURE 1;

FIGURE 4 is an enlarged vertical section, partially in elevation, of an improved fuel feeding mechanism employed for charging the combustion chamber;

FIGURE 5 is an enlarged fragmentary view of an undulating grate structure shown in FIGURE 3;

FIGURE 6 is a transverse section, partially in elevation, taken substantially along the line 6—6 of FIGURE 2; and FIGURE 7 is an enlarged cross-sectional view of the undulating grate taken along the line 7—7 of FIGURE 5.

Figure 3:
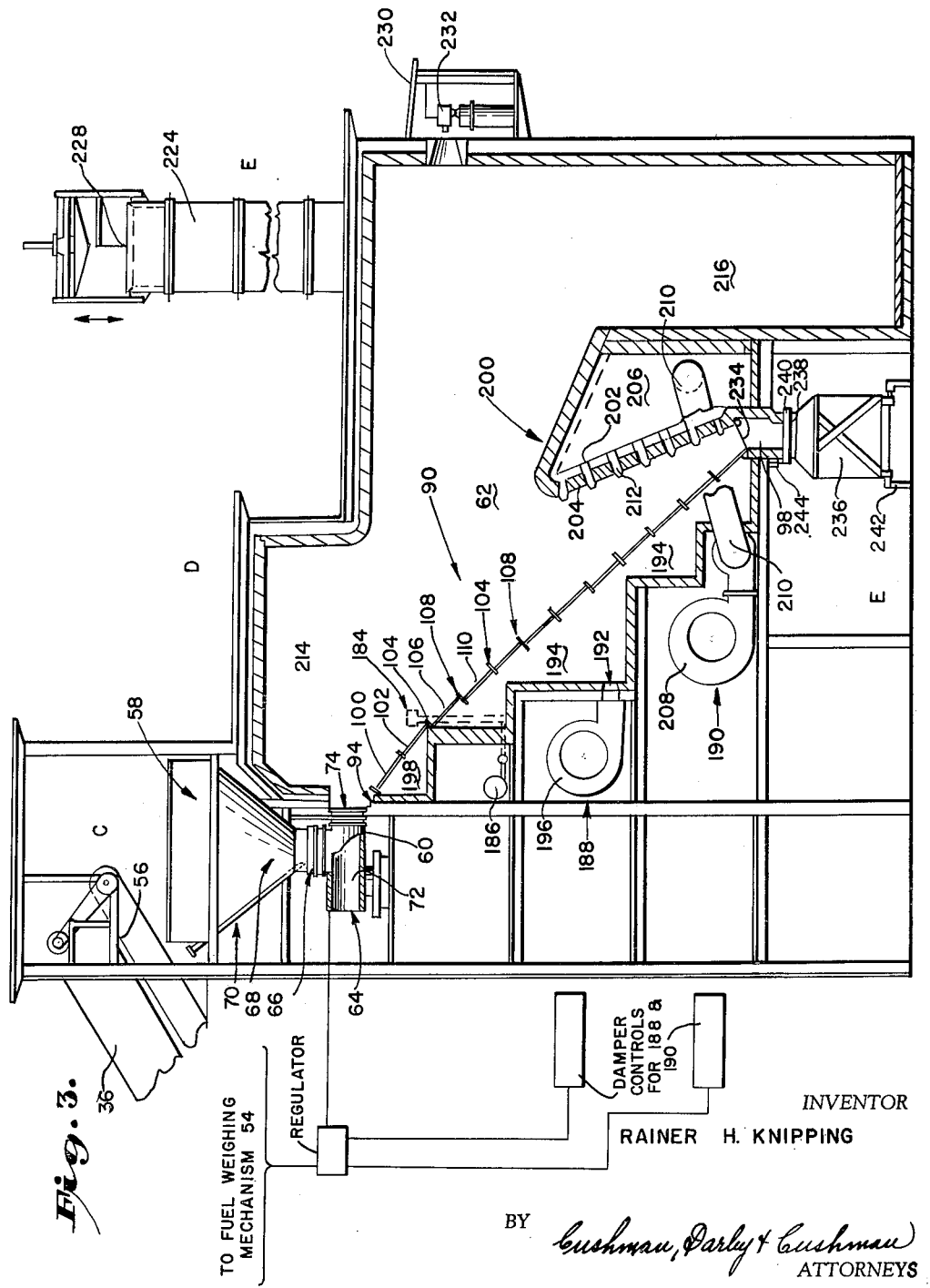
FIGURE 3 is a vertical section, partially in elevation, illustrating the details of the combustion chamber, with certain control means shown diagrammatically.

In order to avoid excessive accumulation of municipal garbage and rubbish, it has become necessary to provide processing facilities that may be continuously operated at different disposal rates which are determined by daily tonnage requirements. In the present invention, the disposal rate of the garbage incinerator is directly dependent upon the induction displacement of the mechanical feeder, which in turn is automatically regulated by the weight of the material delivered for consumption. In this connection, the disposal system illustrated in the accompanying drawings generally includes the following processing stations; namely, unloading and storage, weighing, feeding, combustion, and removal, which are represented by the letters A through E, respectively. For the sake of clarity, each of the aforementioned processing stations will be separately discussed hereinafter.

A. *Unloading and Storage*

In operation, the collected garbage and rubbish will initially be transported to an unloading station 10, shown in the form of a submerged pit 12 to permit direct dumping of the waste material. The capacity of the pit can easily be varied to accommodate the daily collections, or may be eliminated altogether by unloading the material directly upon a suitable conveyor.

Located immediately above collection pit 12 is an upper discharge hopper 16 which serves to direct the collected garbage onto an endless conveyor 18 disposed horizontally along the bottom of the pit. In turn, pit conveyor 18 will deliver the garbage to an inclined main transfer conveyor 20 which serves to vertically elevate the material. Located immediately below the upper discharge end of transfer conveyor 20, are a pair of secondary distributing conveyors 28 and 30 which extend laterally in opposite directions toward vertical storage towers 32 and 34, respectively. The aforementioned main and secondary conveyors preferably are enclosed within a suitable housing 36 which is sealed to prevent contamination of the surrounding atmosphere. Additionally, suitable walkways 38 and access windows 40 are located within the housing 36 to permit servicing of the various conveyors.

The size or number of vertical storage towers employed can be suitably varied in order to maintain a storage ratio directly proportional to the total daily capacity of the disposal system. In this way, it is possible to vary the tonnage consumption rate of the garbage incinerator to accommodate the capacity of each storage tower. For example, a pair of storage towers, similar to the type illustrated in the drawings, would be desirable to maintain a two-thirds storage to one-third consumption ratio.

In order to facilitate even distribution of the material within each tower, a centrifugal distributor 42 can be employed. Preferably, the distributor is positioned immediately below the discharge end of the secondary distributing conveyor so that the material will be directed radially toward the vertical walls of the storage tower whereupon it will fall downwardly onto a pick-up conveyor 44 located at the bottom of each tower. Conveyor 44 preferably is of the load-bearing type having overlapping collection pans of sufficient structural rigidity to withstand the weight of the stored material A pair of inclined lifting conveyors 46 and 48 are employed to separately transfer the material from each of the storage towers to the elevated weighing station. Each of the lifting conveyors has a loading end located immediately beneath the discharge end of the associated storage conveyor 44 and an upper end leading into the weighing station.

It should be understood, however, that while the various conveyors employed in the present invention are illustrated as being of the endless type having opposite ends rotatably supported by rollers 22 and 26, any other well known type of conveyor may also be used. Additionally, in this connection, any of the aforementioned conveyors may include a plurality of conveying flights or pans 24 to prevent slippage of the material as it is being elevated or transported between successive processing stations. Moreover, each of the conveyors can be separately driven at any desired speed in order to maintain a predetermined delivery rate between each of the stations.

B. *Weighing*

In order to accurately control the consumption rate of the incinerator without interrupting operation of the disposal system, the weight of the material must be continuously recorded while it is being transported from storage station A to feeding station C. This is accomplished by a weighing station B, shown in the form of a scale house 50, which generally includes a pair of conveyor type scales 52 and 54 for receiving and weighing the material as it is discharged from the upper end of lifting conveyors 46 and 48, respectively. The scale conveyors 52 and 54 each move the material laterally toward a central delivery conveyor 56 which in turn leads directly to feeding station C. Since the material is being continuously weighed while in transit to deliver conveyor 56, the consumption rate of the garbage incinerator may be determined without having to delay the processing operation. It should be noted that the delivery speed of lifting conveyors 46 and 48, as well storage conveyors 44, can be directly controlled in order to maintain a predetermined delivery schedule. In this way, incinerator consumption can be regulated in proportion to the amount of material received in the storage facilities.

C. *Feeding*

Once the material has been weighed, it is then transferred to the incinerator feed hopper 58 by delivery conveyor 56. The incinerator feed hopper 58 is located immediately above a charging chamber 60 of the incinerator. as shown in FIGURES 3 and 4. Located within charging chamber 60 is a mechanical feeder or stoker 64 which reciprocates across the lower discharge opening 66 of feed hopper 58 in order to intermittently interrupt the flow of material into the chamber as the fuel charge of garbage and rubbish is fed through chamber outlet opening 74 directly into combustion chamber 62.

In order to prevent the material from obstructing feed hopper 58, the hopper throat 68 must be of sufficient size to allow the same to pass freely into charging chamber 60. In this connection, a plurality of pneumatic pokers 70 are mounted within the hopper, each having a forward ram portion 73 which reciprocates beyond a protective shield 71 into throat 68 to prevent any obstruction of the discharge outlet 66. The reciprocating pokers 70 may be operated separately or in any desired combination depending upon the type of material being consumed. In this way, larger objects will be forced downwardly through discharge outlet 66 into charging chamber 60 at timed intervals so as to prevent clogging of the hopper throat 68.

The consumption rate of the garbage disposal system can be accurately controlled through the mechanical feeder 64 by regulating the displacement of the reciprocating piston 72. This may be done either by increasing or decreasing the number of strokes per unit of time or by changing the stroke length. For example, when the weight or density of the matrial changes, the speed of the reciprocating piston can be proportionately increased or decreased to maintain a constant feeding rate into combustion chamber 62, by suitable automatic regulating means as indicated diagrammatically in FIGURES 1 and 3. In operation, as piston 72 moves toward the feed outlet opening 74, it will close hopper discharge opening 66 sufficiently to interrupt the flow of material into charging chamber 60 while the preceding charge of garbage fuel is being forced outwardly through feed opening 74 into combustion chamber 62.

In order to vary the displacement of the mechanical feeder 64, the driving means, shown in the form of a double-acting pneumatic cylinder 78 mounted on a supporting bracket 81 which slides within trackway 80, can be adjusted to regulate the advancement of piston head 82 in relation to discharge opening 66 for controlling the amount of material fed to the charging chamber during each stroke of the piston. Preferably, the forward portion 84 of piston head 82 will extend outwardly through outlet opening 74 into combustion chamber 62 when the piston has been advanced to a forward position restricting hopper outlet 66. On the other hand, piston displacement can also be regulated by varying the stroke in any well known manner.

Located between charging chamber 60 and combustion chamber 62 is a water-cooled, shutoff gate 76 which serves to close outlet opening 74 when the incinerator is shut down. Normally, gate 76 will remain open until the fuel has been exhausted and the disposal operation discontinued, whereupon it will be closed to prevent cold air from entering the combustion chamber.

D. *Combustion*

Since the discharge rate of the mechanical feeder 64 will be automatically regulated, as indicated in FIGURES 1 and 3, in proportion to the weight of material passing through weighing station B, combustion efficiency can be maintained regardless of the varying fuel charge being continually introduced into combustion chamber 62. As the fuel charge enters combustion chamber 62, it tumbles downwardly across transitory steps 94 onto an undulating grate structure 90 which serves to move the material progressively through the furnace. In order to obtain complete combustion of the waste material, the volume of air supplied must be regulated in proportion to the amount of fuel introduced, while the air pressure within the combustion chamber must be balanced to effect a controlled reflex movement of furnace gasses across the fuel bed.

Referring now to FIGURES 3 and 4, inclined grate structure 90 preferably includes a series of successive overlapping grate sections, generally designated by the numeral 96, which are flexibly interconnected at each end to define a continuous undulating upper supporting surface for producing a lifting as well as progressive feeding action on the material as it moves downwardly through the combustion chamber. As shown, each of the undulating sections 96 have one end pivotally supported for movement about a stationary fulcrum 104 while the opposite end is freely mounted for oscillatory movement. Preferably, grate sections 100 and 102 which are mounted immediately beneath the lower-most transitory steps 94, form a stationary hearth which serves to initially heat the material before it is delivered to the next succeeding grate section 106. In turn, the upper portion of section 106 is pivotally connected to a stationary bar or fulcrum 104 for movement about a horizontal axis extending tranverse to grate sections 96, while the opposite, lower free-end portion rests upon a driving link 108 which oscillates between extended and retracted portions shown in phantom in FIGURE 5. Pivotally connected to drive link 108 is the upper portion of an adjacent grate section 110 which has a forward leading edge 174 positioned immediately below the overlapping trailing edge 178 of the preceding grate section 106 to form a flexible joint therewith.

Any suitable type of driving means, such as a reciprocating jack 112 having a piston rod 114 slidably mounted within channel guides 116, can be employed to actuate drive link 108. In order to control the rate of movement of the material as it is fed downwardly along the inclined grate 90, the amplitude of mechanical flexure, as well as the period of oscillation, can be varied in any well known manner to meet operational requirements. For example, if the continuous undulating grate surface defined by the flexibly interconnected grate sections 106 and 110 is inclined at an angle of 45° and the mechanical flexure or rocking knee action limited to a magnitude of approximately 3 inches above and below the mean thrust line, the material will be progressively fed along the upper surface of the grate an estimated distance of 3 to 4 inches each oscillation. Assuming each flexible joint oscillates 4 cycles per minute to effect a feeding movement of 3 inches per oscillation, this would amount to a total progressive movement of 1 foot per minute or 60 feet per hour. At this rate, a flexible grate 6 feet wide and 60 feet in length would represent 360 square feet of usable surface area per hour. On the other hand, if the feeding rate were increased to 80 feet per hour or 48 seconds per foot, 480 square feet of usable grate area per hour would be obtained without varying the physical dimensions of the flexible grate. Accordingly, the magnitude of fuel consumption can be proportionately increased or decreased by merely varying the period of oscillation in accordance with the amount of material being introduced into combustion chamber 62 by the mechanical feeder 64.

Each of the remaining successive grate sections are substantially identical in both structure and operation to sections 106 and 110, having adjacent ends flexibly interconnected about alternate fixed and movable axes. Accordingly, a detailed description of one entire section will suffice for all.

In this connection, each of the aforementioned grate sections 96 preferably include a pair of outer side elements 120 and 122 which are flexibly interconnected by a central grate panel 124 to form a continuous upper supporting surface, as shown in FIGURE 7. Side element 120 consists of an elongated body 126 having oppositely tapered upper and lower inner side walls 128 and 130, respectively, and an outer side wall 132. Upper side wall 128 tapers downwardly away from outer wall 132 to form an inwardly projecting neck portion 134 having a depending terminal flange 136 for defining a downwardly facing channel 138 with the lower side wall 130 of the elongated body 126. On the other hand, central panel 124 generally includes a pair of symetrically elongated side members 118 and 140 which are integrally interconnected by an upper web portion 142. Located adjacent the outer top edge of side member 118 is a tapered rib portion 144 which extends upwardly toward channel 138 to form an overlapping flexible joint, generally indicated by the numeral 146. Similarly, the outer side element 122 of each individual grate section also includes a pair of elongated side members 148 and 150 which are integrally interconnected at their upper ends by web portion 152. In order to form a flexible connection between side element 122 and the central interconnecting panel 124, an outwardly projecting neck portion 154 is provided on the upper edge of side member 140, which terminates in the form of a depending flange 156 to define a channel 158 overlying rib portion 160 formed along the upper edge of body member 148. Symmetrically tapered inner side walls 128 and 162 of outer grate elements 120 and 122, respectively, extend upwardly a sufficient distance above the upper supporting surfaces of interconnecting webs 140 and 152 to define a depressed main channel 164 therebetween for receiving and laterally retaining the waste material as it is progressively fed across each successive grate section. Additionally, a pair of secondary liquid channels 166 and 168 are formed along the top edge of each web porton to prevent any seepage of liquid below the undulating grate structure.

Located between the lower side wall 130 of elongated body 126 and the adjacent side member 118 of central panel 124 is a passageway 170 for directing a stream of air upwardly through the flexible joint 146 and outwardly past depending flange 136. A similar air passageway 172, leading from beneath the grate section, is located between adjacent side members 140 and 148 for directing a stream of air outwardly over rib portion 160 past depending flange 156 and laterally across secondary liquid channel 168. Since the tapered neck portions 134 and 154 of side element 120 and central panel 124 overlap associated rib portions 144 and 160, any air directed downwardly onto the grate section will be deflected laterally across the fuel bed away from the air outlets to prevent the material from entering passageways 170 and 172. Additionally, air passageways 170 and 172 can be constructed with metering orifices 173 which will control the amount of air desirable for a specified grate capacity. It should be noted, however, that the lateral dimension of each grate section can easily be varied by merely substituting an interchangeable central panel of a different width without replacing either of the individual outer side elements.

As best shown in FIGURES 4 and 5, the forward leading edges 174 of outer side elements 120 and 122, as well as central panel 124, are pivotally supported by a suitable bracket 176 for swinging movement about one of the afore-mentioned transverse axes, while the rear trailing edges 178 thereof rests freely upon the next succeeding grate section. In this connection, it is desirable to form arcuate bearing surfaces 180 and 182 on both the leading and trailing edges of each grate section 96 which will register with a complementary bearing surface formed on an adjacent grate section to permit free pivotal movement therebetween.

In order to insure ignition of the waste material, a set of oppositely disposed ignition burners 184 are employed which preferably have been located immediately above the inclined grate 90 adjacent the lower end of the stationary hearth (i.e. grate section 102). The material which is being fed into combustion chamber 62 at a preselected rate determined by the displacement of the mechanical feeder 64 will be initially heated by suitable hot air tuyeres (not shown) as it tumbles downwardly across the transitory steps 94. The air blast from the tuyeres will tend to drive out any vapor; and by the time the waste material has been moved to the lower end of the stationary hearth, the temperature of the material will have been elevated to at least 300° F. so that when it passes beneath the ignition burners 184, it will immediately flash into flame if not already burning when it reaches this point. Preferably, the ignition burners are of the premix type which utilizes a blower 186 to produce a concentrated flame at the burner nozzle for the purpose of penetrating the fuel bed, particularly when it possesses a high liquid content.

Air is supplied to the combustion chamber under pressure by two separate systems, each of which can be individually controlled to maintain optimum combustion efficiency. Preferably, the furnace compartment should be sealed from the atmosphere in order to permit regulation of the amount of air introduced by the under-grate and over-grate air systems, which are generally designated by the numerals 188 and 190, respectively. Such regulation may be in accordance with the weight of the material delivered to the furnace by the weighing conveyors 52 and 54 and the feeder 64, as indicated diagrammatically in FIGURES 1 and 3. Air for under-grate service is supplied by a separate blower 196, the capacity of which is limited to approximately 40% of the total amount of air required for combustion efficiency, and is introduced through inlet 192 into plenum chamber 194 which extends immediately beneath the undulating grate 90. Additionally, an under-hearth plenum chamber 198 can be employed for directing air through the stationary hearth sections 100 and 102 to drive out and vaporize any fluids which are trapped in the material before it reaches the upper portion of the undulating grate 90.

In this connection, a 300 ton unit requires approximately 28,600 c.f.m. of air for combustion; 40% of which amounts to 11,440 c.f.m. at 2 inch static pressure. In order to maintain this head of pressure, the escape area, defined by air passageways 170 and 172, must be carefully controlled and limited to approximately 250 square inches. Accordingly, the restrictive orifices 173, formed between grate elements 120, 122, and central panel 124, must be carefully calibrated in order to maintain the desired volumetric pressure within system 188 to produce a uniform air flow pattern across the fuel bed. In this way, the under-grate air stream will first cool each grate section to prevent "hot spots" and then will escape upwardly through passageways 170 and 172 where it will be deflected laterally across the fuel bed and dissipated. By carefully metering the escape area of each orifice 173, there is no possibility of a localized blowout through the thinner layers of the fuel bed which otherwise would occur resulting in a non-uniform and uncontrolled burning rate and accompanying loss of combustion efficiency.

To facilitate complete combustion, a reflex arch 200 is employed having a plurality of over-grate air outlets 202 formed along the inclined arch wall 204 for directing a blast of air downwardly across the top of the inclined undulating grate 90. Since the over-grate air system 190 is designed to handle approximately 60% of the total volume of air required for complete combustion of a given amount of waste material, it is essential that a predetermined ratio between the output volume of the two air systems 188 and 190 be proportionately maintained in balance at all times. In other words, while the total volume of air supplied to the combustion chamber may vary in accordance with the amount of material being consumed, as indicated diagrammatically in FIGURES 1 and 3, the combustion air ratio between the under-grate and over-grate air system will remain substantially constant.

Located within reflex arch 200 is in overhead air chamber 206 which is supplied by a blower 208 through manifold 210, as shown in FIGURE 3. Each of the air outlets 202 disposed along wall 204 preferably include an adjustable nozzle 212 for controlling the distribution of the concentrated air blast in a predetermined pattern across the top of the progressively descending fuel bed.

Since only the upper surface of the fuel bed will burn when air is supplied from above, it is desirable to introduce additional air directly into the fuel bed to promote complete combustion of the material. However, a blast of air directed upwardly through the entire fuel bed would have a tendency to continuously extinguish the surface flame thereby decreasing the burning rate and reducing combustion efficiency. Therefore, in order to accelerate combustion, the over-grate air system 190 must drive the flame structure downwardly into the fuel bed while the under-grate air system 188 serves to support internal combustion of the material by laterally deflecting the air through the fuel bed in a manner previously described.

Suitable damper controls (not shown) are employed to separately control the amount of air supplied to each system as well as to regulate the pressure maintained in the combustion chamber. Additionally, reflex arch 200 serves to intensify and concentrate the heat of combustion so as to thoroughly ignite and consume all of the combustibles which are progressively fed along the undulating grate sections. It should be understood, however, that the inclination of the reflex arch may be suitably varied with respect to angular disposition of the undulating grate 90 as long as the overgrate air supply can be directed across the upper surface of the fuel bed. Since undulating grate 90 is continuously cooled by the under-grate air stream which passes across the bottom surface of each grate section, the heat of combustion can be intensified by reflex arch 200 without damaging the individual gate sections. Additionally, in order to maintain proper combustion efficiency, the combined air pressure of both air systems should not exceed a maximum of 0.01 inch at any point within the combustion chamber.

Located in the upper portion of combustion chamber 62 is a recessed compartment 214 for collecting any gas vapor which has been driven off from the material as it progresses across the hearth. Since reflex arch 200 will produce a sheet of flame which rises toward the top of the combustion chamber, the burning gases will form a barrier for consuming any of the gas captured in trap 214 before they can be discharged through the furnace exhaust system. Preferably, arch wall 204 is lined with a suitable plastic refractory which extends upwardly along the front and continues across the top of the reflex arch 200, while combustion chamber 62 is lined with suitable tile and fire brick to withstand elevated combustion temperatures of above 1600° F.

E. *Removal*

To facilitate removal of fly ash from the furnace gases, a collection chamber 216 has been employed. Collection chamber 216, which is located within combustion chamber 62 immediately behind reflex arch 200, serves to direct the furnace gases downwardly toward the bottom of the chamber and outwardly through subsidence chambers 218 and 220. In order to promote maximum precipitation of any fly ash from the furnace gases before they are expelled into the atmosphere through vertical exhaust stacks 222 and 224, a plurality of filter baffles 226 are employed which define a tortuous path for reducing the velocity of the gas while it is still in a high temperature zone. Since combustion chamber 62 must be pressurized, an adjustable damper 228 is mounted on each of the vertical outlet stacks 222 and 224. In this way, pressure losses at the exhaust outlet can be reduced to a minimum by automatically adjusting the position of each damper to a preselected position in response to slight changes of pressure within the combustion chamber. Additionally, temperature losses within the combustion chamber will be kept to a minimum thereby increasing combustion efficiency and reducing noxious odors resulting from incomplete combustion. To assure complete combustion of the material, a suitable observation port 230, which houses a television camera 232, has been designed for relaying flame structures to a centralized observation station.

Removal of non-consumed ashes is achieved in the present invention through a discharge passageway 98 located adjacent the lower end of the undulating grate 90. In order to control the amount of ash which passes through discharge passageway 98, a suitable ash supporting member, shown in the form of a releasable damper 234, is utilized. Once the ashes are discharged from the combustion chamber, they are collected and transported to suitable storage facilities, either by a conveyor system or by ash removal carts. Since the combustion chamber is pressurized, the ash disposal system should also be sealed to prevent leakage which would interrupt combustion. Accordingly, individual ash receiving containers 236 can be employed, each having an inlet 238 for registering with discharge passageway 98. A sealing collar 240 has been used to prevent pressure from escaping from the system while ashes are being discharged into the ash receiving containers 236. Each of the containers can easily be mounted on a conveyor or upon a separate trackway 242. Additionally, sealing collar 240 can be automatically raised and lowered into sealing engagement about the container inlet 238 by a suitable fluid lift 244 disposed adjacent discharge passageway 98. In this way, individual ash containers can be continuously filled and removed without interrupting operation of the entire system.

During normal operation, garbage, mixed with trash and rubbish, as collected by a municipal refuse department, is continuously delivered to the main transfer conveyor 20 by dumping the same through hopper 16 onto the pick-up conveyor 18. Transfer conveyor 20, in turn, will elevate the waste material and discharge the same onto secondary conveyors 28 and 30 which serve to distribute the material between vertical storage towers 32 and 34. From the storage towers, the waste material is transferred to the weighing station by auxiliary lifting conveyors 46 and 48 where it is weighed on scale conveyors 52 and 54 before being transferred to the main delivery conveyor 56. From the main delivery conveyor, the material is discharged into the incinerator feed hopper 58 which communicates directly with charge chamber 60. The displacement of mechanical feeder 64 is regulated in direct proportion to the weight of waste material delivered for consumption. Once the material is discharged into combustion chamber 62, it will be progressively fed along inclined grate 90 by the undulating movement of each successive section 96 until it is completely consumed. As the waste material moves downwardly toward ash outlet 98, the fuel bed will be subjected to a controlled air stream to facilitate complete combustion. Additionally, a reflex arch 200 has been employed to intensify the heat of combustion by directing the flow of the furnace gases upwardly in a direction counter-current to the movement of garbage fuel along the inclined grate. By carefully controlling the volume of air in relation to the amount of material being introduced into the combustion chamber for consumption, as indicated diagrammatically in FIGURE 1 and 3, it is possible to maintain combustion efficiency at all times regardless of the consumption rate of the incinerator. This is primarily achieved through a differential air supply wherein 40% of the combustion air is introduced below the grate while 60% of the total air volume is directed from above the grate downwardly upon the upper surface of the bed to promote complete combustion of the material.

Once the waste material has been consumed, the ashes are discharged through outlet 98 while the furnace gases are directed outwardly through subsidence chambers 218 and 220 before being expelled through vertical exhaust stacks 222 and 224. Adjustable dampers 228 are located within each stack to prevent a pressure drop within the combustion chamber. From the above, it is readily apparent that the disposal rate of the incinerator can be varied without decreasing combustion efficiency to meet different tonnage requirements which will vary widely in accordance with daily collections.

Although several preferred embodiments of the present invention have been shown in the drawings and described with considerable particularity in the foregoing specification, it should be understood that the present invention is not limited to the specific details of construction, shown and described, but includes all modifications coming within the scope of the appended claims and their equivalents.

I claim:

1. An incinerator for the disposal of waste material comprising, a furnace in the form of an enclosed combustion chamber having a fuel inlet as well as separate gas and ash outlets, said fuel inlet being off-set vertically above said ash outlet, a charging chamber communicating with the inlet of said combustion chamber, delivery means for supplying said charging chamber with said material, means for continuously weighing said material while it is being delivered to said charging chamber, feeding means disposed within said charging chamber for introducing said material into said combustion chamber at a charging rate determined by the weight of the waste material actually delivered to said charging chamber, an inclined grate structure extending transversely across said combustion chamber and longitudinally between said fuel inlet and said ash outlet for dividing said combustion chamber into separate upper and lower compartments, means for separately supplying air under pressure to said upper and lower compartments, and control means for proportionately regulating the total volume of air between said upper and lower compartments in accordance with the amount of fuel introduced into said combustion chamber, said control means including air passageways formed along said grate structure for controlling the flow of air between said compartments.

2. An incinerator as defined in claim 1 wherein said feeding means includes a reciprocating mechanical feeder, the displacement of which can be varied in direct proportion to the weight of waste material delivered to said charging chamber for disposal.

3. An incinerator as set forth in claim 2 wherein the volume of air supplied by said lower air chamber is limited to approximately 40% of the total amount of air required for complete combustion of a given amount of fuel.

4. An incinerator for the disposal of combustible material comprising, a furnace in the form of an enclosed combustion chamber having a fuel entrance for receiving said material as well as separate gas and ash outlets, a charging chamber communicating with the fuel entrance of said combustion chamber, storage means for receiving said material, delivery means for transferring said material from said storage means to said charging chamber, means for continuously weighing said material while it is being transferred to said charging chamber by said delivery means, and feeding means disposed within said charging chamber for introducing said material into said combustion chamber at a charging rate directly proportional to the weight of material actually transferred from said storage means.

5. An incinerator as defined in claim 4 wherein the capacity of said delivery means can be varied in accordance with the amount of material received by said storage means.

References Cited in the file of this patent

UNITED STATES PATENTS

| | | |
|---|---|---|
| 789,135 | Baggaley | May 9, 1905 |
| 889,806 | Reed | June 2, 1908 |
| 1,183,797 | Carpenter et al. | May 16, 1916 |
| 1,360,285 | Gibson | Nov. 20, 1930 |
| 1,805,618 | Foresman | May 19, 1931 |
| 1,922,883 | Crago | Aug. 15, 1933 |
| 1,973,697 | Bailey | Sept. 18, 1934 |
| 2,263,403 | Stone | Nov. 18, 1941 |
| 2,330,309 | Ormsby | Sept. 28, 1943 |
| 2,381,182 | Puckett | Aug. 7, 1945 |
| 2,406,398 | Pernet | Aug. 27, 1946 |
| 2,700,479 | Carlson et al. | Jan. 25, 1955 |
| 2,727,733 | Carswell | Dec. 20, 1955 |
| 2,925,055 | Miller et al. | Feb. 16, 1960 |

FOREIGN PATENTS

| | | |
|---|---|---|
| 748,981 | Great Britain | May 16, 1956 |